United States Patent [19]
Cain

[11] 3,781,943
[45] Jan. 1, 1974

[54] HYDRAULIC DOOR CLOSER
[75] Inventor: James P. Cain, Youngstown, Ohio
[73] Assignee: Marlboro Manufacturing Inc., Alliance, Ohio
[22] Filed: June 23, 1972
[21] Appl. No.: 265,515

[52] U.S. Cl............................ 16/52, 16/66, 188/317
[51] Int. Cl................................................ E05f 3/10
[58] Field of Search...................... 16/52, 51, 66; 137/513.4; 251/122; 138/46; 188/317, 318, 319, 320

[56] References Cited
UNITED STATES PATENTS

| | | | |
|---|---|---|---|
| 3,057,004 | 10/1962 | Sogoian | 137/513.3 X |
| 1,584,981 | 5/1926 | De Hon | 16/52 |
| 2,382,500 | 8/1945 | Owens | 251/122 |
| 995,217 | 6/1911 | Bishop | 16/51 |
| 1,455,584 | 5/1923 | Graham | 16/66 X |
| 3,161,908 | 12/1964 | Walach | 16/52 |
| 1,151,805 | 8/1915 | Lombard | 188/320 |
| 2,996,754 | 8/1961 | Ziegler et al | 16/52 |
| 3,413,679 | 12/1968 | Waldo | 16/52 |
| 3,335,451 | 8/1967 | Patriquin | 16/52 |

Primary Examiner—Francis K. Zugel
Assistant Examiner—Peter A. Aschenbrenner
Attorney—Webster B. Harpman

[57] ABSTRACT

A hydraulic cylinder has a piston movable therein on a piston road threadably engaged in said piston. The rod extends out of the cylinder through a gland at one end and a spring is positioned between that end of the cylinder and the piston and normally urges the piston toward the other end of the cylinder which is closed. Valve means in the piston control the flow of fluid in the cylinder from either side of the piston and permit a rapid flow of fluid in one direction and a controlled flow of fluid when the piston is moved in the other direction. Rotation of the cylinder or the piston rod adjusts the controlled valving action and thereby the rate of closing action of the door closer.

1 Claim, 3 Drawing Figures

PATENTED JAN 1 1974 3,781,943

3,781,943

HYDRAULIC DOOR CLOSER

BACKGROUND OF THE INVENTION

1. Field of the Invention:

This invention relates to hydraulic door closers of the type incorporating a spring for closing the door and a quantity of fluid, the flow of which is valved with respect to the piston to obtain a desirable rate of closure.

2. Description of the Prior Art:

Prior structures of this type have included several forms of valves, some of which may be operated by rotation of the cylinder or the piston rod to alter the valve setting. U.S. Pat. No. 2,996,754 provides a centrally apertured piston forming the fluid passage with an extension of the piston receiving the piston rod and a fluid passage formed in said extension so that the position of the piston rod relative to the fluid passage acts as a valve element. U.S. Pat. No. 3,161,908 has the same type of apertured piston with the extension threadably receiving the piston rod and provides a fluid channel in the extension and parallel with the rod with the channel terminating inwardly of the faces of the piston so that the relative positioning of the end of the piston rod acts as a valve element. This invention mounts the piston in a threaded extension of the piston rod and provides a needle valve registry between a portion of the piston and the piston rod for a controlled valve action and a movable O-ring gasket for a secondary open or closed valve bypassing the needle valve.

SUMMARY OF THE INVENTION

A hydraulic door closer comprises an elongated hydraulic cylinder closed at one end with a fitting by which it may be rotatably engaged on a door, has a piston movable therein and urged toward the closed end by a spring therein. A gland closes the other end of the cylinder with respect to a movable piston rod engaged in the piston and extending outwardly of the cylinder and hydraulic fluid in the cylinder moves past the piston in large volume by means of an O-ring bypass valve when the piston and piston rod are moved to compress the spring as in a door opening action and the fluid moves through a valve controlled passage in the piston with the O-ring bypass valve closed when the piston and piston rod are moved toward the closed end of the cylinder by the spring. Rotation of the cylinder and the piston or the piston rod serves to reposition a needle valve configuration on the piston rod with respect to a matching needle valve configuration in the piston to provide an exteriorly adjustable hydraulic door closer.

DESCRIPTION OF THE PREFERRED EMBODIMENT

Figure 1:
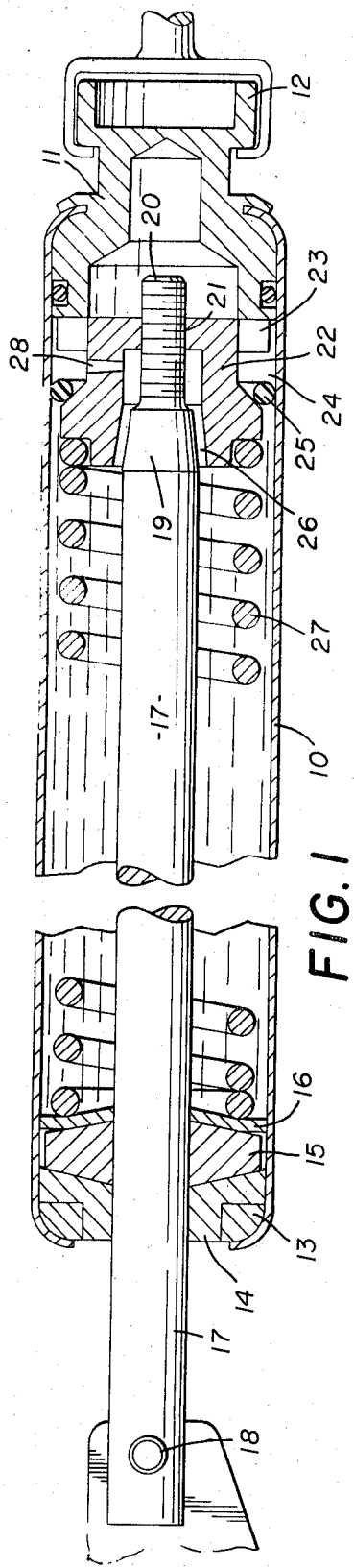
FIG. 1 is a side elevation of the hydraulic door closure with parts broken away and parts in cross section and showing the door closer in fully closed position.

In its simplest form the hydraulic door closer of this invention comprises an elongated hydraulic cylinder 10 having a closure head 11 sealed in one end, the closure head having an end configuration 12 that may be rotatably positioned in a bracket on a door (not shown). An end seal 13 is positioned in the other end of the cylinder 10 by an end seal support 14 and a tube seal 15 and a compression washer 16 form a fluid tight gland about a movable piston rod 17. The exterior end of the piston rod 17 is apertured as at 18 so that it can be attached to a bracket for example on a door frame adjacent a door to be closed and the other end of the piston rod 17 has a conical section 19 formed inwardly of the end thereof so that the end portion defines an extension 20 of smaller diameter which is threaded. The threaded extension 20 of the piston rod 17 is engaged in a threaded opening 21 in a piston 22, the periphery of which has a plurality of circumferentially spaced passageways 23 therein communicating with an annular groove 24 in which a movable O-ring valve element 25 is positioned. A passageway 26 is formed axially of the piston 22 and a portion thereof has a conical surface of slightly larger diameter than the conical section 19 of the piston rod 17.

A coil spring 27 is positioned between the compression washer 16 and the inner end of the piston 22 and normally urges the piston 22 toward the head 11. A radially extending passageway 28 communicates with the passage 26 and the annular groove 24 in the exterior of the piston 22.

Figure 2:
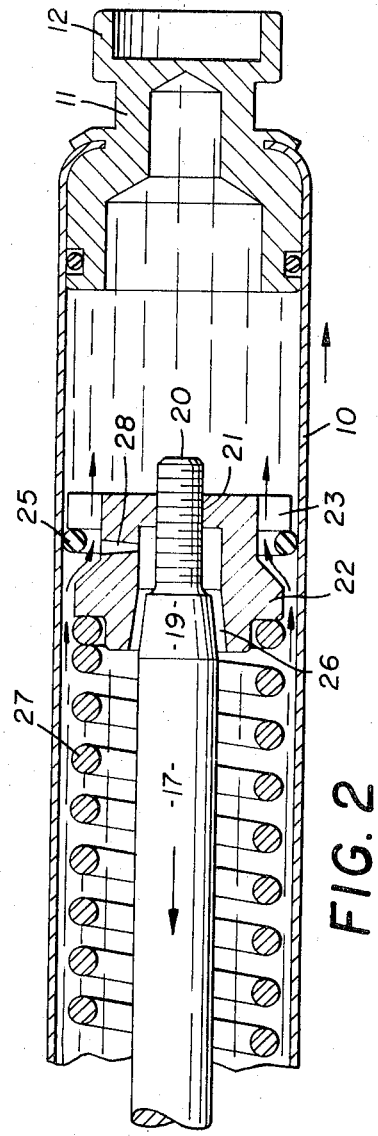
FIG. 2 is a side elevation with parts broken away and parts in cross section showing a portion of the hydraulic door closer with the piston moving toward the left in a door opening action, arrows indicate the flow of fluid.

When the head 11 and more particularly the outermost portion 12 thereof is positioned in a bracket on a door to be closed and the end of the piston rod 17 is secured to a bracket on a door frame in which the door to be closed is hinged, the spring 17 will move the piston 22 toward the head 11 and thereby close the door. When the door is opened the movement of the cylinder 10 away from the piston 22 as seen in FIG. 2 of the drawings, requires the fluid therein to flow past the piston 22 and it will be seen that it can easily flow in relatively large volume around the periphery of the piston 22 as the O-ring valve 25 will move with the fluid and away from its sealing position as seen for example in FIGS. 1 and 3 of the drawings. The O-ring 25 when moved against the end of the piston will not block the passageways 23 and the fluid flows as indicated by the arrows in FIG. 2.

Figure 3:
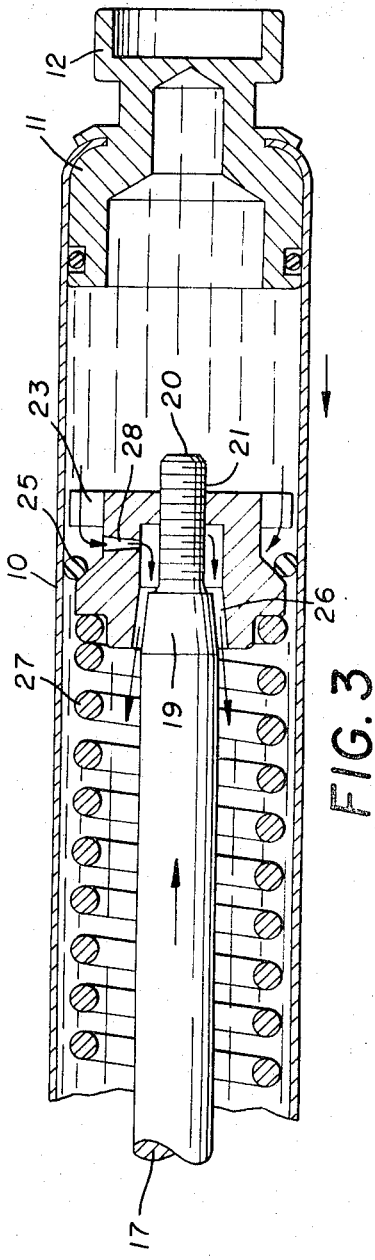
FIG. 3 is a side elevation with parts broken away and parts in cross section showing a portion of the hydraulic door closer with the piston moving toward the right in a door closing action with arrows indicating the fluid flow.

By referring now to FIG. 3 of the drawings, it will be seen that when the spring 27 moves the piston 22 toward the closure head 11 the fluid between the head 11 and the piston 22 must flow to the other side of the piston and it will therefore move through the passageways 23 into the annular groove 24. It cannot proceed around the periphery of the piston 22 due to the sealing location of the O-ring valve 25 and it must therefore flow through the passage 28 and the passage 26 and thereby move between the conical section 19 on the piston rod 17 and the conical wall portion in the piston 22 defining the passageway 26 and as shown by the arrows in FIG. 3 of the drawings.

It will occur to those skilled in the art that by rotating the cylinder 10 while the piston rod 17 is held against rotation as by its engagement with the bracket on the door frame as heretofore mentioned, the relative position of the conical section 19 of the piston rod and the conical wall in the piston 22 defining the passageway 26 is changed so that a controlled valving action may be readily obtained and adjusted as desired. It will further be seen that the adjustment directly affects the rate of closing action of the hydraulic door closer as imparted to a door to which it is attached.

It will thus be seen that a simple and efficient hydraulic door closer has been disclosed which may be readily adjusted by rotating the hydraulic cylinder thereof so as to speed up or slow down the rate of closing action imparted a door by the device and it will further be seen that no exterior valve actuating means are necessary and that the several parts of the hydraulic door closer disclosed herein may be readily fabricated and assembled to produce a highly efficient, relatively inexpensive device.

Although but one embodiment of the present invention has been illustrated and described, it will be apparent to those skilled in the art that various changes and modifications may be made therein without departing from the spirit of the invention.

I claim:

1. A door closer including a hydraulic cylinder, a piston in said cylinder frictionally engaging the same, said piston having an axial bore, one portion of which is conical, a second portion of which is of uniform diameter and a third portion of which is of smaller diameter than said second portion and is threaded, a piston rod having a conical section inwardly of one end and an adjacent threaded extension of smaller diameter than said concial section threadably engaged in said threaded portion of said piston and closing one end of the axial bore, the other end of said piston rod extending outwardly of one end of said cylinder, means connected to the outwardly extending end of the piston rod to hold said rod against rotation, sealing means between said cylinder and said piston rod, a closure in the other end of said cylinder, a mounting bracket adapted to be fixably mounted and to rotatably engage said closure, said piston having a fluid passageway comprised of an annular groove in the periphery of said piston inwardly from the ends thereof, passage means connecting the ends of said piston with said annular groove, a passageway formed radially in said piston connecting said annular groove with said second portion of said bore, said second portion of said bore connected to a passageway formed by said conical portion of said rod being positioned within said conical wall portion of said piston as the threaded extension of said rod engages the threaded portion of said piston, said passageway being formed between said concial portions and comprising the opposite end of said axial bore, the passageway through said piston being adjustable by axial movement of said conical portion of said piston with respect to said conical portion of said rod as by rotation of said cylinder and piston relative to said rod, an O-ring valve element moveably positioned in said annular groove so as to allow fluid flow into said annular groove as piston moves in one direction and to prevent fluid flow into said annular groove as piston moves in the opposite direction.

* * * * *